No. 892,672. PATENTED JULY 7, 1908.
P. MESSNER.
MOUTH ORGAN.
APPLICATION FILED JAN. 2, 1907.
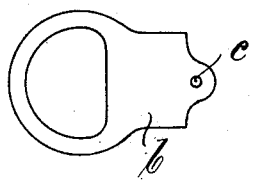
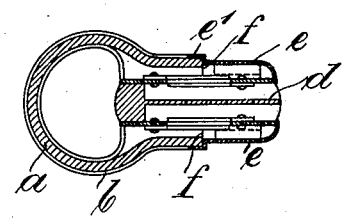
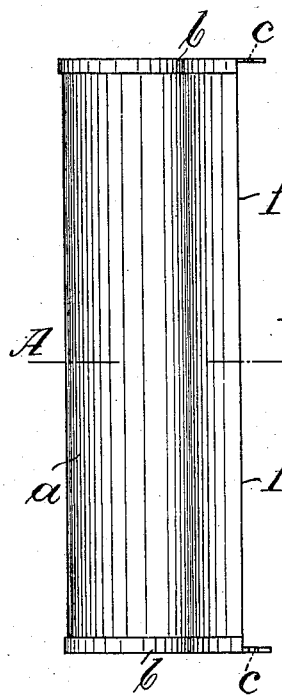
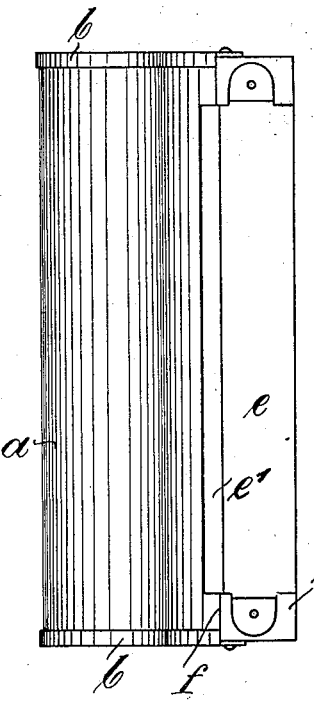
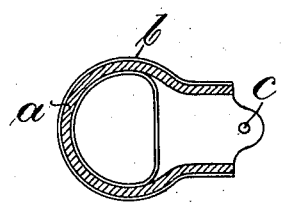
Witnesses:
Inventor:
Paul Messner
by T. F. Bowne
his Attorney

UNITED STATES PATENT OFFICE.

PAUL MESSNER, OF TROSSINGEN, GERMANY.

MOUTH-ORGAN.

No. 892,672.      Specification of Letters Patent.      Patented July 7, 1908.

Application filed January 2, 1907. Serial No. 350,437.

*To all whom it may concern:*

Be it known that I, PAUL MESSNER, a subject of the King of Würtemberg, and resident of Trossingen, in the Kingdom of Würtemberg, German Empire, have invented new and useful Improvements in Mouth-Organs, of which the following is an exact specification.

My invention has for its object an improvement in mouth organs more especially in mouth-accordions, which permits the improvement of the sounds produced by such an instrument in such manner that a strong and pure and agreeable sound of the mouth accordion is obtained. I attain this purpose by providing the mouth accordion with a hollow body, the shape of which is of no importance for the instrument, but the material of which the hollow body is made, must be of a specific substance. The best I have found for this purpose is papier-mâché or any suitable vegetable fiber.

In order to make my invention more clear, I refer to the accompanying drawing, in which by way of an example my improvement is illustrated.

Figure 1 is a front elevation of the hollow body to be attached to the mouth accordion or the like mouth-organ. Fig. 2 is a side elevation of the hollow body, Fig. 3 is a cross-section on the line A—B of Fig. 2, Fig. 4 illustrates the hollow body attached to a mouth accordion in cross-section, and Fig. 5 is a side elevation.

$a$ is the hollow body made of papier-mâché or also of suitable vegetable fibers. $b$ are end-walls of a convenient shape and material, for instance metal-sheet or the like and provided with openings alined with the interior of the hollow body, $c$ is an aperture in the end-wall $b$ permitting the passage of screws for attaching the end-wall to the mouth-accordion.

In the Figs. 4 and 5 the mouth-accordion $d$ is illustrated in combination with the hollow body $a$.

In order to impart a certain attachment of the hollow body to the mouth-accordion the shields $e$ have ends bent at right angles up and down. When the hollow body is properly attached to the mouth-organ, the upper edges $f$ of the hollow body enter below the edges $e'$ thus forming a fine and smooth connection of the organ with the hollow body.

It may be pointed out once more, that the shape of the hollow body is of a secondary importance for my invention, which chiefly consists in the combination of a hollow body made of vegetable fibers or papier-mâché with the mouth-organ.

Having thus fully described the nature of my invention, what I desire to secure by Letters Patent of the United States is:—

1. The combination of a mouth organ with a hollow body made of vegetable fibers, and end walls attached to the hollow body and provided with openings communicating with the interior of said body, the mouth organ being secured between said end walls and communicating with the interior of said body through an opening in the side of the latter.

2. The combination of a mouth-organ, a hollow body provided with end walls having openings, said body also having an integral side extension embracing the mouth-organ, the latter being located between the end walls, and means for connecting the mouth-organ with said end walls.

3. The combination of a mouth-organ, a hollow body provided with end-walls having openings, said body also having a side opening receiving the mouth-organ, said end-walls having projections, and means for connecting the mouth-organ with said projections.

4. The combination of a hollow body having an opening in its side wall, a mouth-organ entering said opening and provided with shields having end portions bent outwardly receiving the edges of the hollow body at its side opening, and means for connecting the hollow body with the mouth organ.

In witness whereof I have hereunto set my hand in the presence of two witnesses.

PAUL MESSNER.

Witnesses:
    PAUL KOHLER,
    WM. HAHN.